(No Model.)
J. G. SMILEY.
CATTLE WASHING DEVICE.
No. 488,778. Patented Dec. 27, 1892.
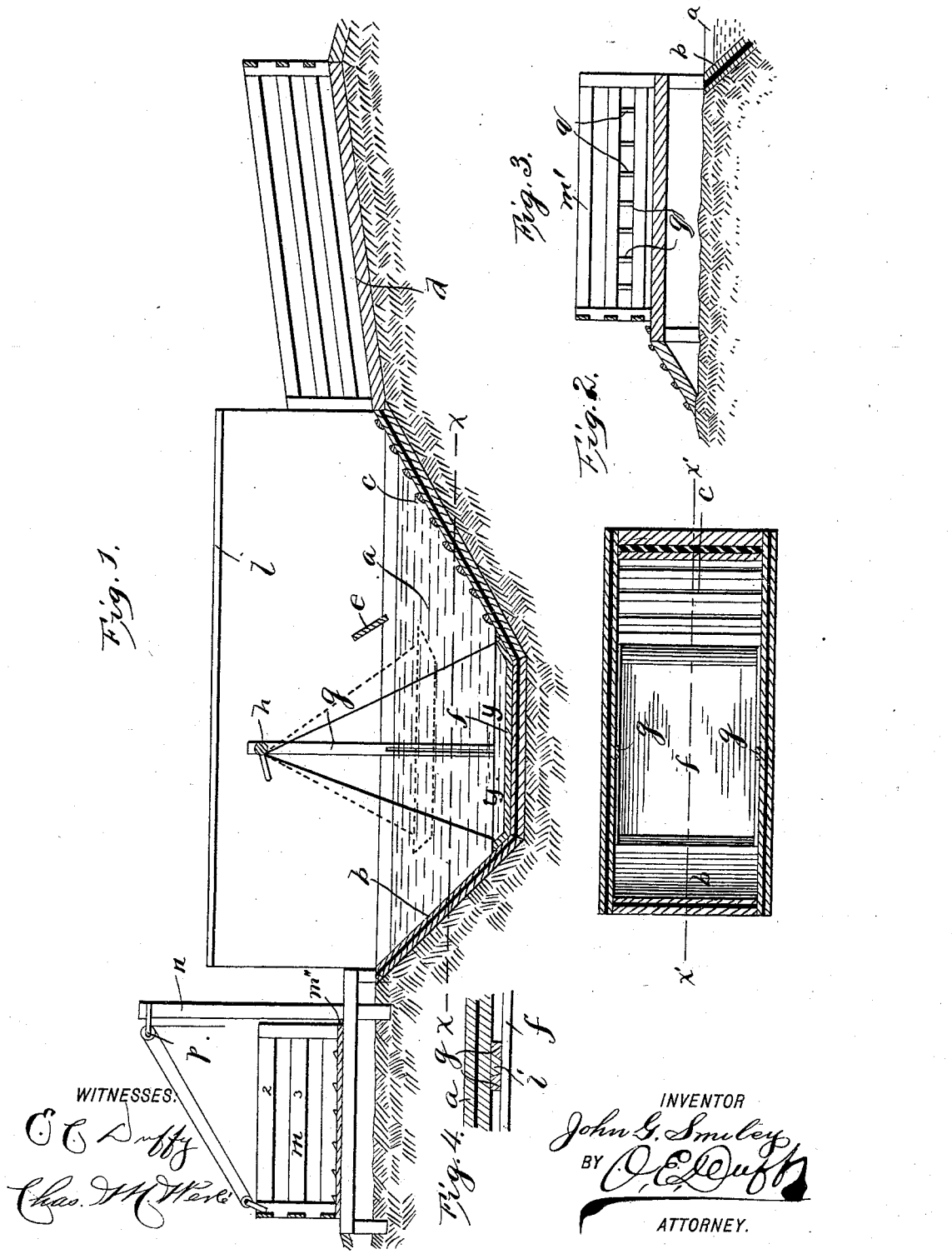

UNITED STATES PATENT OFFICE.

JOHN G. SMILEY, OF HAMPTON, NEBRASKA.

CATTLE-WASHING DEVICE.

SPECIFICATION forming part of Letters Patent No. 488,778, dated December 27, 1892.

Application filed May 24, 1892. Serial No. 434,159. (No model.)

*To all whom it may concern:*

Be it known that I, JOHN G. SMILEY, of Hampton, in the county of Hamilton and State of Nebraska, have invented certain new and useful Improvements in Cattle-Washing Machines; and I do hereby declare that the following is a full, clear, and exact description of the invention, which will enable others skilled in the art to which it appertains to make and use the same, reference being had to the accompanying drawings, and to the letters of reference marked thereon, which form part of this specification.

This invention relates to certain improvements in apparatus for washing cattle.

The object of the invention is to provide an improved apparatus and arrangement whereby cattle can be thoroughly washed and cleansed of dirt and vermin without danger of injury to the cattle or to the attendant, and whereby the work can be thoroughly, quickly and easily accomplished.

The invention consists in certain novel features of construction and in combinations of parts more fully described hereinafter and particularly pointed out in the claims.

Referring to the accompanying drawings;—Figure 1 is a vertical sectional view illustrating the improved apparatus taken in the plane of line $x'-x'$ Fig. 2, dotted lines showing the supplemental bottom or floor in the act of being raised. Fig. 2 is a detail sectional view illustrating more fully the removable bottom of the washing tank taken on line $x-x$ Fig. 1. Fig. 3 is a detail view showing a stationary chute. Fig. 4, is a detail sectional view showing one of the uprights on which the supplemental floor or bottom slides, and the guide rigid with said floor sliding in said upright, the section taken on the line $y-y$ Fig. 1.

In the drawings the reference letter $a$, indicates a suitable tank preferably strongly constructed of timber closely laid and suitably coated or with interposed paper to render the tank water tight. This tank is ordinarily composed of a double thickness of planking with tar or paper between the layers. A large tank can thus be very cheaply constructed by an ordinary mechanic or carpenter. The tank has at one end the smooth incline $b$, and at the other end an incline $c$, provided with suitable cleats or other means so that the animals can walk up this incline out of the tank onto the draining platform $d$, inclined toward the tank to carry the drainage back into the tank. This platform $d$ is inclosed so that the animals cannot make their escape, and is provided with a gate at its outer end.

When an animal has been forced into the tank down incline $b$, the water will be thrown toward the opposite end of the tank where it strikes a transverse deflector $e$, extending across the upper portion of the tank, and inclined from the vertical with upper edge toward incline $b$, so as to throw the water back over the head and neck of the animal. This is usually necessary as the animals endeavor to keep their heads and necks out of water and vermin will move to all parts which remain dry. By this means the vermin are removed from all parts of the animals.

The great quantity of dirt &c. washed from the animals is deposited on an auxiliary vertically movable bottom $f$, in the tank. This bottom slides vertically between and on the upright beams $g$. These guide posts $g$, are suitably secured to the walls or sides of the tank and extend up a suitable distance above the tank, and at their upper ends carry a windlass $h$, of any desirable and suitable construction adapted to be connected by ropes with the removable bottom and thereby when necessary raise the bottom out of the tank so that it can be cleansed. The bottom can then be dropped to its normal position and the ropes removed. The removable bottom, preferably has side pieces $i$, sliding in spaces or ways between the corner uprights or posts.

Suitable hinged vertically swinging covers can be provided to inclose the tank and prevent the water splashing out on the attendants. The lines $l$, indicate these doors or covers.

The preferred device employed for forcing the animal into the tank is shown in Fig. 1, as consisting of a tilting chute $m$, mounted at its inner end at $m''$ above or near the incline $b$, and adapted to have its outer end raised so that the animal will be thrown through the open inner end of the chute into the tank. A hoisting tackle $p$, is provided to raise the outer end of the chute. This tackle is mounted on the uprights $n$, extending up, preferably from the front end of the chute. At its outer end the chute is provided with a suitable gate for keeping the animals within the chute while being raised. The bottom of the chute can be formed in any suitable manner. Any suitable means can be provided for forcing the animals to the open end of the chute if difficulty is encountered in getting the animals into the tank.

Fig. 3 shows a stationary chute $m'$ through which the animals are forced to the tank. In some localities or cases it is not convenient to use the tilting chute so this stationary chute is employed and is provided with the series of pins or notches $q$, along its side beams. These notches or pins serve as fulcrum points for a lever, not here shown, which is placed against a pin or side of a notch with its inner end against the rump of the animal. The attendants can then force the animal through the chute by means of the levers. The tilting chutes can be provided with these fulcrum points $q$, if desired. By using a lever the animal can be pushed forward the distance from one fulcrum point to the next and then held by catching the lever in the next fulcrum.

Having thus fully described my invention what I claim and desire to secure by Letters Patent of the United States is;—

1. The cattle washing apparatus comprising a tank, an entrance thereto and an exit therefrom, and a supplemental vertically movable bottom in said tank provided with raising means so that the bottom can be elevated and cleaned when the tank is not in use, substantially as described.

2. The cattle washing apparatus comprising the tank having an entrance and an exit, the vertically movable bottom of said tank, uprights extending above the bottom to guide the bottom when raised for removing sediment and a windlass carried by said uprights to raise the bottom substantially as described.

3. The cattle washing apparatus comprising the tank having an entrance thereto, and the exit passage therefrom, and the inclined deflector in the upper portion of the tank opposite the entrance thereto to throw water over the cattle on entering the tank, substantially as described.

In testimony that I claim the foregoing as my own I affix my signature in presence of two witnesses.

JOHN G. SMILEY.

Witnesses:
GEORGE T. PROSSER,
J. A. STEELE.